(12) United States Patent
Khalid et al.

(10) Patent No.: US 10,678,333 B2
(45) Date of Patent: Jun. 9, 2020

(54) METHODS AND SYSTEMS FOR PRESENTING HAPTICALLY PERCEPTIBLE VIRTUAL OBJECTS

(71) Applicant: Verizon Patent and Licensing Inc., Arlington, VA (US)

(72) Inventors: Mohammad Raheel Khalid, Budd Lake, NJ (US); Syed Meeran Kamal, Raritan, NJ (US); Lama Hewage Ravi Prathapa Chandrasiri, Princeton Junction, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 15/813,104

(22) Filed: Nov. 14, 2017

(65) Prior Publication Data
US 2019/0146585 A1    May 16, 2019

(51) Int. Cl.
*G06F 3/01*    (2006.01)
*G06T 7/50*    (2017.01)
*G06T 15/00*   (2011.01)

(52) U.S. Cl.
CPC .............. *G06F 3/016* (2013.01); *G06F 3/011* (2013.01); *G06T 7/50* (2017.01); *G06T 15/00* (2013.01)

(58) Field of Classification Search
None
See application file for complete search history.

(56) References Cited

U.S. PATENT DOCUMENTS

| | | | |
|---|---|---|---|
| 2012/0206419 A1* | 8/2012 | Lee | G06F 3/012 345/179 |
| 2012/0229400 A1* | 9/2012 | Birnbaum | G06F 3/016 345/173 |
| 2017/0109936 A1* | 4/2017 | Powderly | G06F 3/012 |
| 2017/0168630 A1* | 6/2017 | Khoshkava | G06F 1/163 |

* cited by examiner

*Primary Examiner* — Stephen T. Reed

(57) ABSTRACT

An exemplary virtual object presentation system accesses depth data for surfaces of a three-dimensional ("3D") virtual object. The system determines, based on the depth data, a set of element configuration operations that, when performed by field formation elements included within an array of reconfigurable field formation elements, form a field in accordance with the depth data. Specifically, the field formed is to be haptically perceptible to a user using a field perception apparatus. The system may direct the field formation elements included within the array of reconfigurable field formation elements to perform the set of element configuration operations to thereby form the haptically perceptible field. In this way, the array of reconfigurable field formation elements generates a haptically perceptible virtual object representative of the 3D virtual object for perception by the user using the field perception apparatus. Corresponding methods are also disclosed.

20 Claims, 11 Drawing Sheets

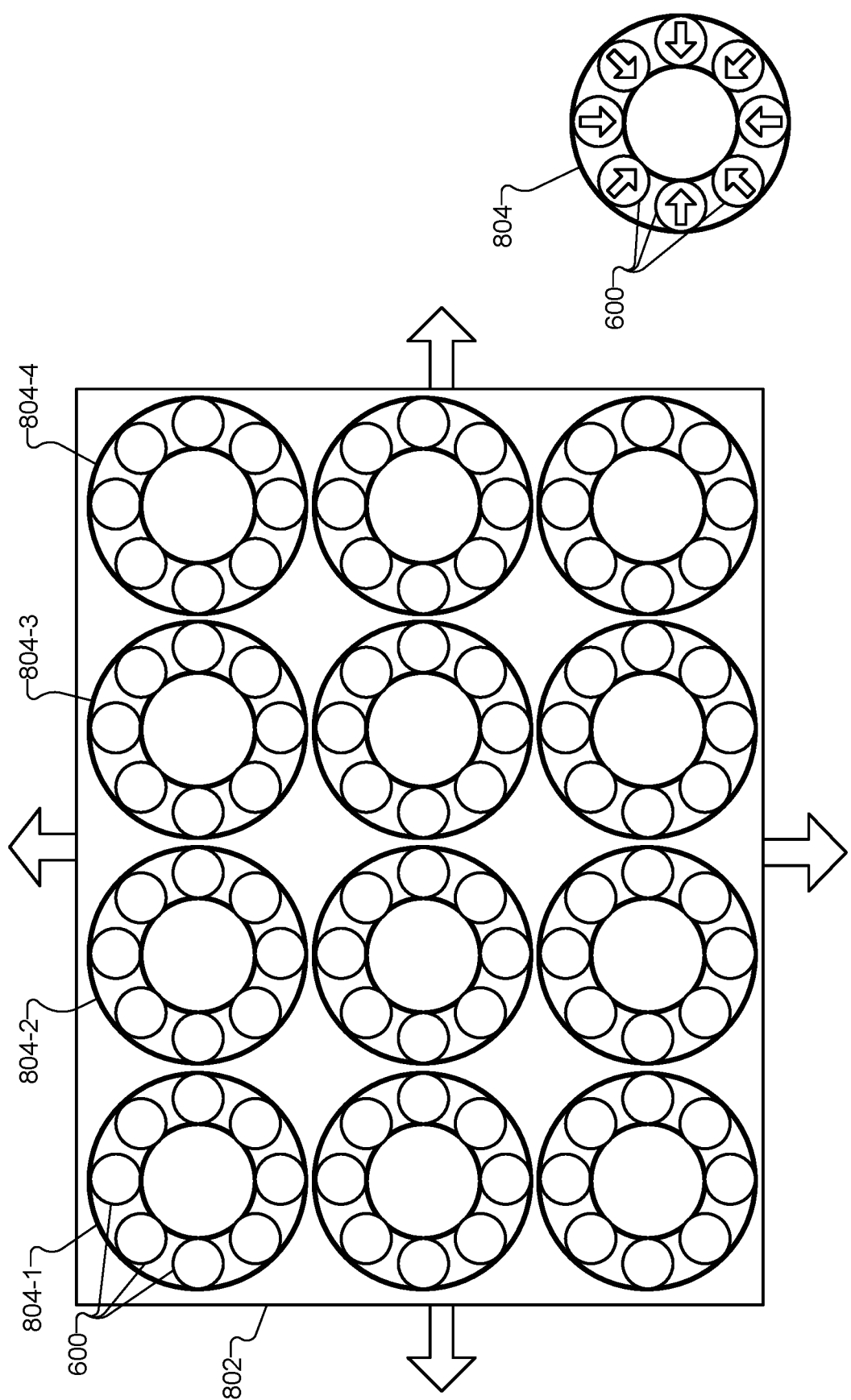

METHODS AND SYSTEMS FOR PRESENTING HAPTICALLY PERCEPTIBLE VIRTUAL OBJECTS

BACKGROUND INFORMATION

Advances in computing and networking technology have made new forms of media content possible. For example, virtual reality content is available that may immerse viewers (or "users") into interactive virtual reality worlds that the users may experience by directing their attention to any of a variety of things being presented in the immersive virtual reality world at the same time. For example, at any time during the presentation of virtual reality content, a user experiencing the virtual reality content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

Virtual reality content experienced by users continues to become increasingly realistic and immersive in terms of what users see and hear within virtual reality worlds. Unfortunately, even while users' visual and auditory senses become increasingly immersed in virtual reality experiences in which sights and sounds are simulated with great realism and accuracy, other senses of the users, including the sense of touch, may be stimulated or immersed in the virtual reality experiences only a little if at all. As a result, even as users are visually and/or audibly immersed in a particular virtual reality experience, a lack of stimulation provided to other senses may detract from an overall immersiveness of the virtual reality experience to the users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8A illustrates exemplary field formation elements formed from field formation components such as the field formation component of FIG. 6 disposed on a two-dimensional surface according to principles described herein.

FIG. 8B illustrates an exemplary configuration for the field formation components forming a particular field formation element of FIG. 8A according to principles described herein.

DETAILED DESCRIPTION OF PREFERRED EMBODIMENTS

Figure 1:
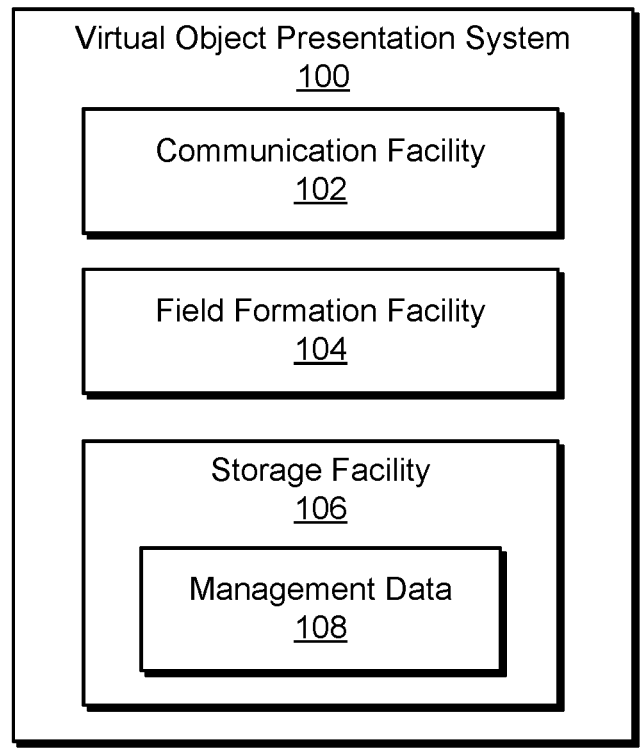
FIG. 1 illustrates an exemplary virtual object presentation system for presenting haptically perceptible virtual objects according to principles described herein.

Methods and systems for presenting haptically perceptible virtual objects are described herein. In particular, as will be described below, methods and systems described herein may be employed to present haptically perceptible virtual objects based on depth data. For instance, in an exemplary implementation, a virtual object presentation system may access (e.g., capture, receive, etc.) depth data for surfaces of a three-dimensional ("3D") virtual object. For example, the 3D virtual object may correspond to a real-world object for which depth data of the surfaces has been captured (e.g., by a plurality of depth capture devices disposed at different positions around the real-world object), a virtualized (e.g., computer-generated) object that is not based on a real-world object, or any other 3D virtual object as may serve a particular implementation. Based on the depth data for the surfaces of the 3D virtual object, the virtual object presentation system may determine a set of element configuration operations that, when performed by field formation elements included within an array of reconfigurable field formation elements, form a field in accordance with the depth data. For example, each field formation element may include one or more field formation components such as individually controllable and/or individually rotatable electromagnets, permanent magnets, or other components capable of forming a field such as a magnetic field, an electric field, an electromagnetic field, or the like.

The field to be formed by the field formation elements when the set of element configuration operations is performed may be configured to be haptically perceptible to a user using a field perception apparatus (e.g., a glove or other wearable apparatus, an accessory, a tool, or another suitable implement configured to interact with the field). Accordingly, the virtual object presentation system may direct the field formation elements included within the array of reconfigurable field formation elements to perform the set of element configuration operations. In this way, the virtual object presentation system may thereby form the haptically perceptible field so as to generate, for perception by the user using the field perception apparatus, a haptically perceptible virtual object representative of the 3D virtual object. For example, if the virtual object is a ball, the field may be formed based on depth data for the ball such that a user wearing a special glove may physically perceive (e.g., by way of the user's sense of touch) the contours of a spherical surface representative of the virtual ball.

The virtual object presentation system described above may be implemented by at least one physical computing device including one or more processors and/or memory modules configured to perform the accessing of the depth data, the determination of the set of element configuration operations, and the direction of the field formation elements described above, as well as any other operations described herein or as may serve a particular implementation. Examples of such physical computing devices that implement or are included within a virtual object presentation system will be described in more detail below.

Additionally or alternatively, an exemplary virtual object presentation system (e.g., the same virtual object presentation system described above or a different virtual object presentation system) may include an array of reconfigurable field formation elements that perform a set of element configuration operations. For example, the set of element configuration operations performed by the array of reconfigurable field formation elements may be received from a physical computing device such as described above (e.g., a physical computing device further included in the same virtual object presentation system or included in a different virtual object presentation system) that accesses depth data for surfaces of a 3D virtual object and determines the set of element configuration operations based on the depth data for the surfaces of the 3D virtual object. As a result of the performance of the set of element configuration operations, the array of reconfigurable field formation elements may form a field that is haptically perceptible to a user using a field perception apparatus. For example, the haptically perceptible field may be formed so as to generate (e.g., for perception by the user using the field perception apparatus) a haptically perceptible virtual object representative of the 3D virtual object.

Methods and systems for presenting haptically perceptible virtual objects described herein may provide various benefits. For example, in addition to providing visual and auditory aspects of virtual reality worlds to immerse users' senses of sight and hearing, methods and systems described herein may further allow virtual reality content providers to provide tactile aspects of the virtual reality worlds that may be haptically perceived to immerse the users' sense of touch. As such, new levels of immersiveness may be provided and experienced by users as virtual objects are not only seen and/or heard, but also touched, felt, manipulated, physically interacted with, and/or otherwise haptically perceived.

Moreover, in providing these benefits, methods and systems for presenting haptically perceptible virtual objects described herein may avoid various disadvantages of other forms of haptic feedback that may be provided by conventional virtual reality systems. For example, the field formed by the array of reconfigurable field formation elements may feel more realistic and may be configured to more dynamically simulate 3D virtual objects than conventional haptic feedback mechanisms based on vibrations, air pressure, sonic-based haptics, and so forth. For example, haptically perceptible fields described herein may be changed and updated rapidly at, for example, a similar or equal refresh rate as a frame rate at which video content is being provided. As such, haptically perceptible virtual objects generated by way of these fields may dynamically change (e.g., move, turn, etc.) in the same fashion as the 3D virtual objects upon which the haptically perceptible virtual objects are based may change. As will be made apparent by various examples and other disclosure described herein, this dynamic updating of haptic stimulation, combined with high quality audio/visual stimulation, may result in virtual reality worlds that are extremely immersive, useful, and enjoyable for users to experience.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual object presentation system 100 ("system 100") for presenting haptically perceptible virtual objects. As shown, system 100 may include, without limitation, a communication facility 102, a field formation facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation. Each of facilities 102 through 106 will now be described in more detail.

Communication facility 102 may include one or more physical computing devices (e.g., hardware and/or software components such as processors, memories, communication interfaces, instructions stored in memory for execution by the processors, etc.) that perform various operations associated with communicating within system 100 and/or communicating with other systems external to system 100. For example, communication facility 102 may be configured to access depth data for surfaces of a 3D virtual object by accessing such depth data from storage facility 106 or from another system (e.g., a storage facility of another system). In the same or other examples, communication facility 102 may be configured to access the depth data by capturing the depth data using depth capture devices included within system 100 (e.g., within communication facility 102) or within a separate system with which system 100 is in communication (e.g. to direct or control the separate system).

As used herein a "3D virtual object" may refer to any model, likeness, or other virtual representation of a tangible object that a user may wish to haptically perceive by way of methods and systems described herein. Additionally, as used herein, "depth data" may include any data representative of a position of a surface (e.g., a surface of a 3D virtual object) with respect to a coordinate system (e.g., a coordinate system associated with a real-world space in which the 3D virtual object was captured, a coordinate system associated with a 3D virtual space in which the 3D virtual object is to be presented, etc.). In contrast to color data, which may represent how surfaces of an object appear from a particular vantage point, depth data may represent how far away different points of a surface are from one or more particular vantage points.

Accordingly, 3D virtual objects and the depth data that describes them may be based on or derived from any suitable source. For example, 3D virtual objects may be based on real-world objects included within real-world scenes that are captured by video and depth capture devices (e.g., video cameras, depth scanning devices, etc.). In some examples, depth data of such real-world objects may be captured in real time or near-real time such that haptically perceptible virtual objects representative of the real-world objects may be generated to represent the real-world objects as they exist in real time (or as near to real time as possible). In other examples, real-world objects may be modeled using 3D modeling techniques such that the virtual objects include 3D or volumetric representations of the real-world objects as they existed at the time of the 3D modeling (e.g., rather than in real time). In still other examples, 3D virtual objects may be virtualized (e.g., partly or completely computer generated) such that the virtual objects represent objects that do not necessarily correlate with any real-world objects. Regardless of the real or virtualized nature of a 3D virtual object, it will be understood that depth data for the 3D virtual object may be accessed (e.g., obtained, captured, received, etc.) by communication facility 102 in any manner as may serve a particular implementation.

Communication facility 102 may further be configured to direct an array of reconfigurable field formation elements to perform a set of element configuration operations (e.g., which may be determined by field formation facility 104, as described below). For example, in response to a determination of the set of element configuration operations by field formation facility 104, communication facility 102 may transmit commands and/or instructions to the array of reconfigurable field formation elements or otherwise direct the array of reconfigurable field formation elements to perform the set of element configuration operations in any manner as may serve a particular implementation.

Field formation facility 104 may also include one or more physical computing components (e.g., hardware and/or software components separate from or shared with those of communication facility 102) that perform various operations associated with forming a field so as to generate a haptically perceptible virtual object representative of a 3D virtual object for which depth data was accessed by communication facility 102. For example, as mentioned above, field formation facility 104 may determine, based on the depth data for the surfaces of the 3D virtual object, a set of element configuration operations that, when performed by field formation elements included within an array of reconfigurable field formation elements, will form a field in accordance with the depth data. For example, the field may mimic various characteristics of the 3D virtual object (e.g., including a shape of the 3D virtual object, a texture of the 3D virtual object, etc.) and may be haptically perceptible to a user using a field perception apparatus (e.g., a magnetic glove or the like, as will be described in more detail below). Field formation facility 104 may then provide the determined set of element configuration operations to communication facility 102 so that system 100 may direct field formation elements included within the array of reconfigurable field formation elements (which may be included within or separate from system 100) to perform the set of element configuration operations. In this way, the array of reconfigurable field formation elements may thereby form the haptically perceptible field so as to generate the haptically perceptible virtual object representative of the 3D virtual object for perception by the user using the field perception apparatus.

Storage facility 106 may maintain any suitable data received, generated, managed, tracked, maintained, used, and/or transmitted by facilities 102 or 104 in a particular implementation. For example, as shown, storage facility 106 may include management data 108, which may include data used by facilities 102 and/or 104 to perform any of the operations described above. As mentioned above, in some implementations, storage facility 106 may include depth data for one or more 3D virtual objects and communication facility 102 may access the depth data from storage facility 106. Storage facility 106 may also maintain additional or alternative data as may serve a particular implementation.

As described above, system 100 may include and/or be in communication with an array of reconfigurable field formation elements that system 100 may direct to perform particular sets of element configuration operations to thereby form a field that is haptically perceptible to a user using a field perception apparatus. Specifically, system 100 may direct the array of reconfigurable field formation elements to form and continuously refresh (e.g., update, reform, etc.) the field so as to generate a haptically perceptible virtual object representative of a 3D virtual object so that the user may touch, manipulate, and/or otherwise perceive or interact with the haptically perceptible virtual object while engaged in a virtual reality experience in which he or she also perceives the virtual object using other senses (e.g., sees the virtual object, hears the virtual object, etc.).

Whether the array of reconfigurable field formation elements is included within system 100 or separate from system 100, the array of reconfigurable field formation elements may perform various sets of element configuration operations received from system 100, which, as described above, may have accessed depth data for surfaces of a 3D virtual object and determined the set of element configuration operations based on the depth data for the surfaces of the 3D virtual object. As a result of the performance of the set of element configuration operations, the array of reconfigurable field formation elements may form a field that is haptically perceptible to a user using a field perception apparatus. In particular, the haptically perceptible field may be formed so as to generate, for perception by the user using the field perception apparatus, a haptically perceptible virtual object representative of the 3D virtual object.

Figure 2:
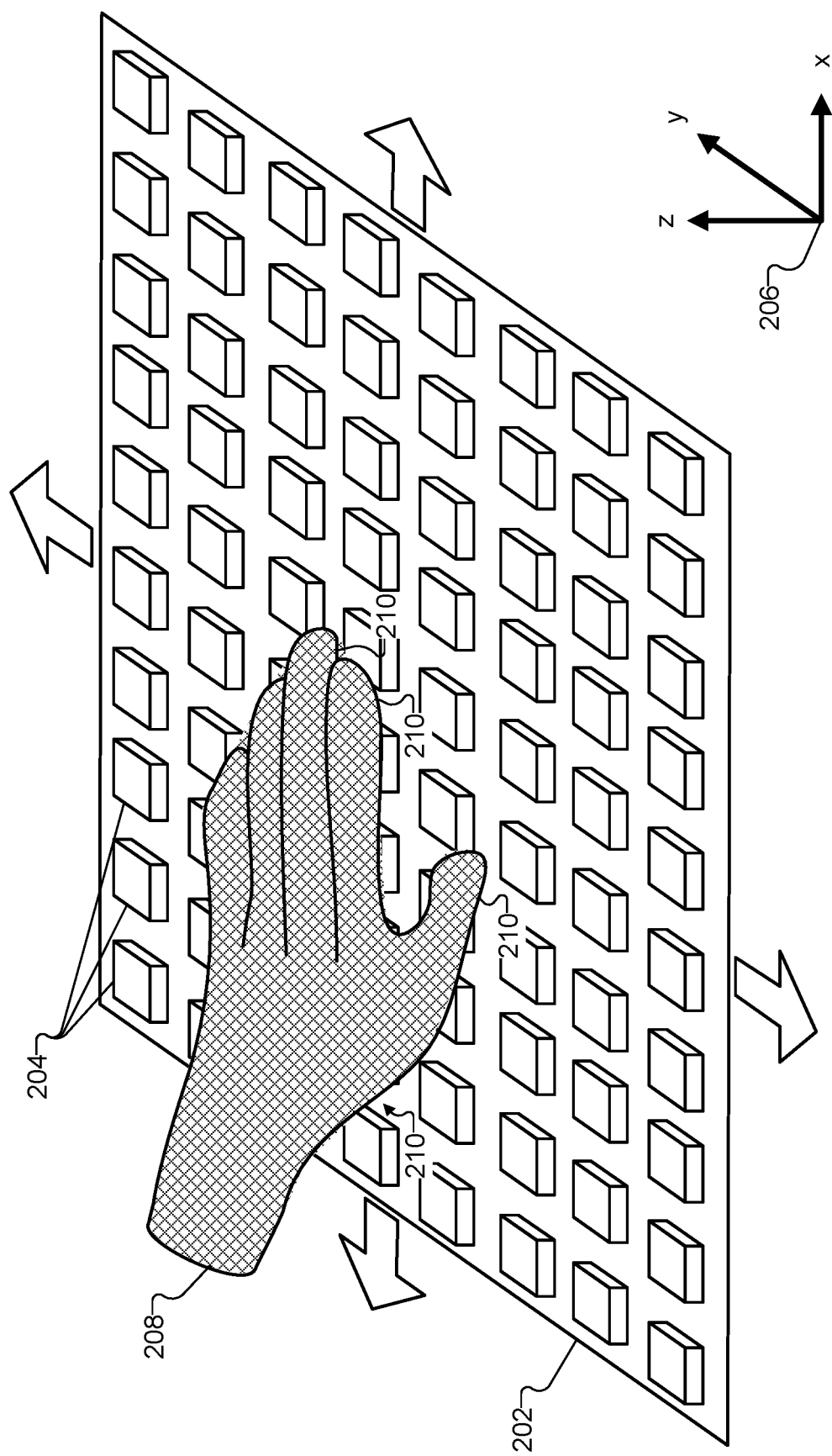
FIG. 2 illustrates an exemplary array of reconfigurable field formation elements used to form a field that is haptically perceptible to a user using a field perception apparatus according to principles described herein.

To illustrate, FIG. 2 shows an exemplary array of reconfigurable field formation elements used to form a field that is haptically perceptible to a user using a field perception apparatus. Specifically, field formation element array 202 includes a plurality of field formation elements 204 disposed in a grid-like arrangement on the x-y plane of a coordinate system 206. As indicated by arrows extending out from each side of the portion of the array shown in FIG. 2, field formation element array 202 may extend in any or all of these directions to be any size as may serve a particular implementation. For example, field formation element array 202 may extend over a surface of a tabletop, along a wall, or the like. As such, it will be understood that the x-y plane of coordinate system 206 along which field formation element array 202 is disposed may not strictly be a flat plane in certain implementations, but may follow the curvature of a surface of a tabletop, wall, or the like. For example, field formation element array 202 may extend along the walls and/or ceiling of an entire chamber (e.g., a spherical chamber, a cylindrical chamber, a rectangular chamber, etc.) large enough for one or more users to enter into while experiencing a virtual reality world.

At any given position on field formation element array 202, field formation elements 204 may be arranged in a substantially two-dimensional ("2D") grid along local x and y coordinate axes of coordinate system 206 such that a field formed by field formation elements 204 may extend outward from the field formation elements 204 along a z-axis of the coordinate system 206. However, it will be understood that, in certain implementations (e.g., where field formation element array 202 is arranged on a surface that curves such as on a wall of a spherical chamber or the like), the coordinate axes of coordinate system 206 may not be universal for every position within field formation element array 202, but rather may change so that each of the axes locally conforms to the curvature of a surface upon which field formation element array 202 is arranged. In other examples, field formation element array 202 may be arranged on a flat surface (e.g., a surface of a tabletop or the like) such that the coordinate axes of coordinate system 206 would be universal across the entire array. For example, an implementation of a flat tabletop-type array of reconfigurable field formation elements may be used to implement a haptically perceptible virtual object such as a control panel (e.g., such as for a flight simulator), a terrain map, a 3D art application, or any other application as may serve a particular embodiment.

Each field formation element 204 may be configured (e.g., by way of individual element configuration operations) to form a field oriented in a particular direction and having a particular shape, field strength, and/or other characteristics. As used herein, field formation elements may "form" a field by generating a field where no field existed before (e.g., by driving current into a coil magnet), by steering a field that already exists in a desirable direction (e.g., by rotating a permanent magnet or a coil magnet that is already engaged to have a particular orientation), and/or by otherwise performing element configuration operations to create or alter a field as may serve a particular implementation. Various types of field formation elements configured to form fields in different ways will be described in more detail below. Each of the field components (e.g., individual fields) formed by individual field formation elements 204 may come together in space to collectively form a field that is highly customizable to conform to various shapes so as to implement a haptically perceptible virtual object that a user may perceive and interact with using a field perception apparatus 208.

For example, as shown in FIG. 2, field perception apparatus 208 may be implemented by a glove worn on the user's hand or as another similar article of clothing configured to interact with the field formed by field formation elements 204 to facilitate the user in perceiving the field. In other examples, field perception apparatus 208 may be implemented in other ways besides as clothing worn by the user. For instance, field perception apparatus 208 may be implemented as a special tool or other implement (e.g., an accessory to field formation element array 202) configured to interact with the field formed by field formation element array 202 in any manner as may serve a particular implementation.

To this end, field perception apparatus 208 may be configured to interact with the field in various ways. For instance, the haptically perceptible field formed by field formation elements 204 may be a magnetic field, and field perception apparatus 208 may have magnetic properties itself that may allow field perception apparatus 208 to interact with the magnetic field. Specifically, in some implementations, field perception apparatus 208 may allow a user to perceive the magnetic field by including material that forms an opposing magnetic field configured to repel the magnetic field. For example, field perception apparatus 208 may be constructed from or coated with a ferromagnetic material (e.g., iron, etc.) that is treated to cause electrons within the material to align so as to form an opposing magnetic field. For instance, if the shaped magnetic field formed by field formation elements 204 has a north polarity of the field facing in the +z direction with respect to coordinate system 206 (e.g., facing upwards toward field perception apparatus 208), the material of field perception apparatus 208 may be configured to form an opposing magnetic field in which the north polarity of the field is facing in the −z direction (e.g., facing downward toward field formation element array 202) so as to oppose the magnetic field formed by field formation element array 202. In this way, a user wearing field perception apparatus 208 will haptically perceive the repelling force between the magnetic fields respectively formed by field perception apparatus 208 and field formation element array 202.

In the same or other examples, field perception apparatus 208 may include material that is treated (e.g., coated, etc.) with a diamagnetic substance (e.g., silver, etc.) configured to repel magnetic fields such as the magnetic field formed by field formation element array 202. Thus, in these examples, the user wearing field perception apparatus 208 may perceive the repelling force between field perception apparatus 208 and field formation element array 202 regardless of which direction the magnetic field faces (e.g., with north or south facing upward in the +z direction). Additionally or alternatively, field perception apparatus 208 may include material that is heated past a Curie point so as to be in a paramagnetic state, or may be otherwise treated or configured to interact with the magnetic field formed by field formation element array 202 in any manner as may serve a particular implementation.

In order to form a field so as to generate a haptically perceptible virtual object representative of a particular 3D virtual object, field formation element array 202 may shape the field in a very particular way such that the user using field perception apparatus 208 may feel the haptically perceptible virtual object in a similar manner as he or she would feel it if it were a real object in the real world. To this end, it may be ideal to form a magnetic field that matches each contour of each surface of the 3D virtual object being simulated at all times.

In certain examples (e.g., for certain 3D virtual objects, in certain implementations of field formation element array 202, etc.), such shaping of the magnetic field to match the surface contours of a 3D virtual object shape may be performed. However, in other examples, it may be impractical, difficult, and/or inefficient to form such a field for various reasons. For example, while field formation elements 204 may in some sense be analogous to "voxels" forming a 3D volume, "pixels" forming a 2D image, or the like (e.g., forming a haptically perceptible field analogous to the visually perceptible volumes and images formed by the voxels and pixels), field formation elements 204 may be constrained in ways that conventional voxels and pixels are not. First, it may be difficult to miniaturize field formation elements 204 to achieve a resolution that is comparable to an image resolution with which a virtual object may be visually presented to the user. Additionally, as will be described in more detail below, field formation components making up each field formation element 204 may be shared by neighboring field formation elements 204 such that neighboring field formation elements 204 may not be usable at the same time. Moreover, forming a field that cannot be seen and is not presently being haptically perceived may consume (and waste) power, generate unwanted heat, and/or otherwise create inefficiency and undesirable results.

For these and other reasons, it thus may be desirable, in certain implementations, for field formation element array 202 to dynamically form a haptically perceptible field only at positions in space where the field is actually being perceived (e.g., only where the user is actually touching the haptically perceptible virtual object). As such, system 100 may further be configured to track, as the user perceives the haptically perceptible virtual object using field perception apparatus 208, a dynamic location of one or more contact points 210 (e.g., fingertips, palms, and/or other suitable contact points for other types of field perception apparatuses 208) of field perception apparatus 208 with respect to a field formed by field formation element array 202. System 100 may then perform the determining of the set of element configuration operations (e.g., that will be performed to generate the haptically perceptible field) taking into account the tracking of contact points 210. For example, the haptically perceptible field formed when the determined set of element configuration operations is performed may be shaped so as to include one or more apex points corresponding to the tracked dynamic locations of contact points 210.

Figure 3:
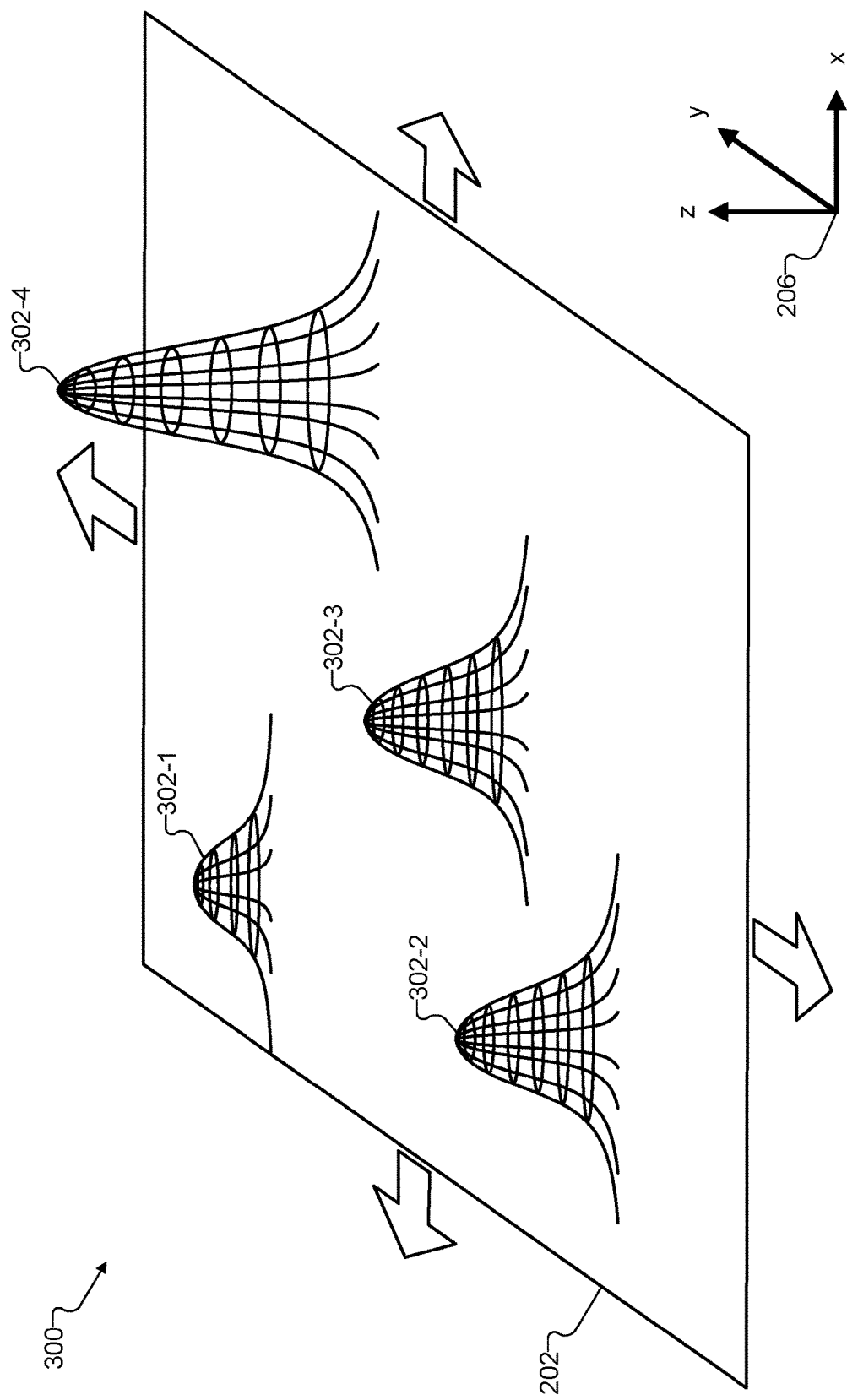
FIG. 3 illustrates an exemplary haptically perceptible field formed by the array of reconfigurable field formation elements of FIG. 2 according to principles described herein.

To illustrate, FIG. 3 depicts an exemplary haptically perceptible field formed by field formation element array 202 and that includes a plurality of apex points 302 (e.g., apex points 302-1 through 302-4). Rather than forming a field that continuously generates all the surfaces of a haptically perceptible virtual object at all times (e.g., even when particular surfaces are not presently being perceived), FIG. 3 shows how, based on the tracking of contact points 210, field formation element array 202 may form apex points 302 on a dynamic, "as-needed" basis. In this way, the user may perceive a haptically perceptible virtual object as if it were a solid and continuous object even though the haptically perceptible virtual object actually includes only the points being perceived by the user at any given moment.

As shown, each apex point 302 of the haptically perceptible field formed by field formation element array 202 may be implemented as a Gaussian-shaped field that is highly localized (e.g., pointed) to be strong within a relatively narrow region of space while being significantly weaker in regions surrounding the narrow region. By dynamically forming apex points 302 at strategic locations with respect to field formation element array 202, flux density of the field may be concentrated at certain locations to form sharp distinct points perceivable as hard, solid surfaces, and/or to form less distinct points perceivable as softer surfaces.

As mentioned above, field formation element array 202 may also be directed, by way of a continuous stream of sets of element configuration operations from system 100, to dynamically refresh (e.g., reform, reshape, reconfigure, etc.) the haptically perceptible field so as to keep up with the user's movements (e.g., to keep up with tracked changes in the positions of contact points 210 of field perception apparatus 208) as well as to keep up with movements of the 3D virtual object within a virtual reality world the user is experiencing. For example, the haptically perceptible field may be configured to be refreshed at a rate corresponding to a video frame rate at which visual stimulation representative of the virtual reality world is presented to the user.

In order to dynamically track contact points 210 so as to dynamically refresh the haptically perceptible field at a suitable rate (e.g., a rate fast enough that the user feels as if he or she is touching a solid object as apex points 302 follow contact points 210 across field formation element array 202), system 100 and/or field formation element array 202 may perform the tracking of contact points 210 in any manner as may serve a particular implementation. For example, contact points 210 may be tracked by way of the individual field formation elements 204 (or field formation components thereof) that are generating the field. When a field being formed is opposed by another field with a particular force, more power output may be required from field formation elements 204 to maintain the field than when the field faces no opposing force. Accordingly, contact points 210 may be tracked based on how much power is being drawn from each of field formation elements 204 as field perception apparatus 208 moves over them and applies the opposing force to them. Additionally or alternatively, other tracking techniques may be employed such as capacitive or resistive tracking (e.g., analogous to the tracking of one or more fingertips on a touch screen of a personal computing device), visual or depth-based tracking (e.g., using one or more cameras, depth capture devices, or the like to detect where contact points 210 move with respect to reference points included on field formation element array 202), a combination of the tracking techniques described above, or any other tracking techniques as may serve a particular implementation.

As mentioned above, any of the haptically perceptible fields described herein (e.g., including fields having a plurality of apex points 302 corresponding to tracked contact points 210 of a field perception apparatus 208) may be formed by a combination of fields individually formed or produced by field formation elements such as field formation elements 204 in an array of reconfigurable field formation elements such as field formation element array 202. To this end, field formation elements 204 may be implemented in various different ways using different types of field formation components collectively forming dynamic fields in accordance with depth data of 3D virtual objects and/or tracked data representative of movements of a field perception apparatus used by a user. A few exemplary types of field formation elements that may be used to form haptically perceptible fields will now be described.

In certain examples, each field formation element 204 included within field formation element array 202 may include a plurality of field formation components each implemented as an individually controllable coil magnet (e.g., electromagnet) having an individually adjustable field strength. Such a field formation component will be illustrated and described below in relation to FIG. 4. In other examples, each field formation element 204 included within field formation element array 202 may include a plurality of field formation components each implemented as an individually rotatable magnet (e.g., a permanent magnet) that rotates about an axis to face in an individually adjustable direction. For example, the magnet may be disposed on a rotating arm of a motor (e.g., a servo motor) or other such rotation mechanism. This type of field formation component will be illustrated and described below in relation to FIG. 6.

Additionally or alternatively, other types of field formation elements (e.g., composed of other types of field formation components) may be used in certain implementations. For instance, individually controllable coil magnets may be disposed on a rotating arm of a motor so as to be individually rotatable about an axis to face in an individually adjustable direction. In other examples, coil magnets that are not individually controllable (e.g., that are controlled collectively so as to each have the same settings at all times) may be disposed on the motor to be individually rotatable. Additionally or alternatively, field formation components such as quadrupole magnets, Halbach cylinders, or other suitable field formation components may be employed as may serve a particular implementation.

Figure 4:
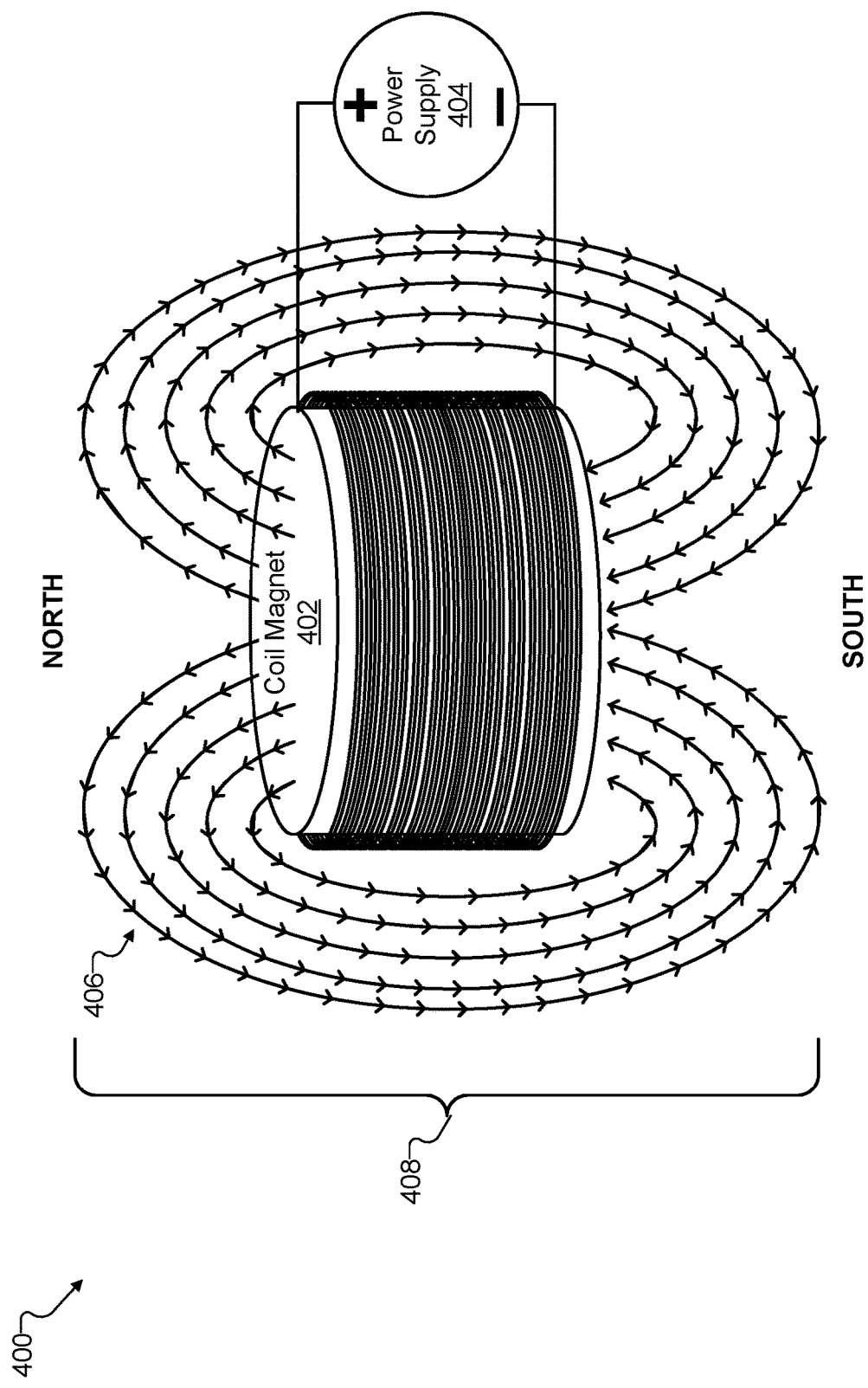
FIG. 4 illustrates an exemplary field formation component that may be included within a field formation element in the array of reconfigurable field formation elements of FIG. 2 according to principles described herein.

FIG. 4 illustrates an exemplary field formation component 400 that may be included within one or more field formation elements in an array of reconfigurable field formation elements (e.g., such as one or more of field formation elements 204 in field formation element array 202). Field formation component 400 includes a coil magnet 402 that is individually controllable by way of a power supply 404. Based on whether power supply 404 is turned on or off, and based on how much voltage and/or current power supply 404 provides to coil magnet 402, coil magnet 402 may form an individual field 406 (also referred to herein as a "field component"). When combined in space with individual fields or field components formed by neighboring field formation components similar to field formation component 400, field 406 may help form a haptically perceptible field having an individually adjustable field strength 408 (e.g., a haptically perceptible field such as that illustrated in FIG. 3 that includes apex points 302).

Field 406 may be combined with other fields to form the haptically perceptible field in any suitable manner. For example, a field formation element included within an array of reconfigurable field formation elements may include a subset of individual field formation components included within a plurality of field formation components. For example, each field formation component may be implemented to be like field formation component 400 and the plurality of field formation components may be arranged in a two-dimensional ("2D") grid such as illustrated in FIG. 5.

Figure 5:
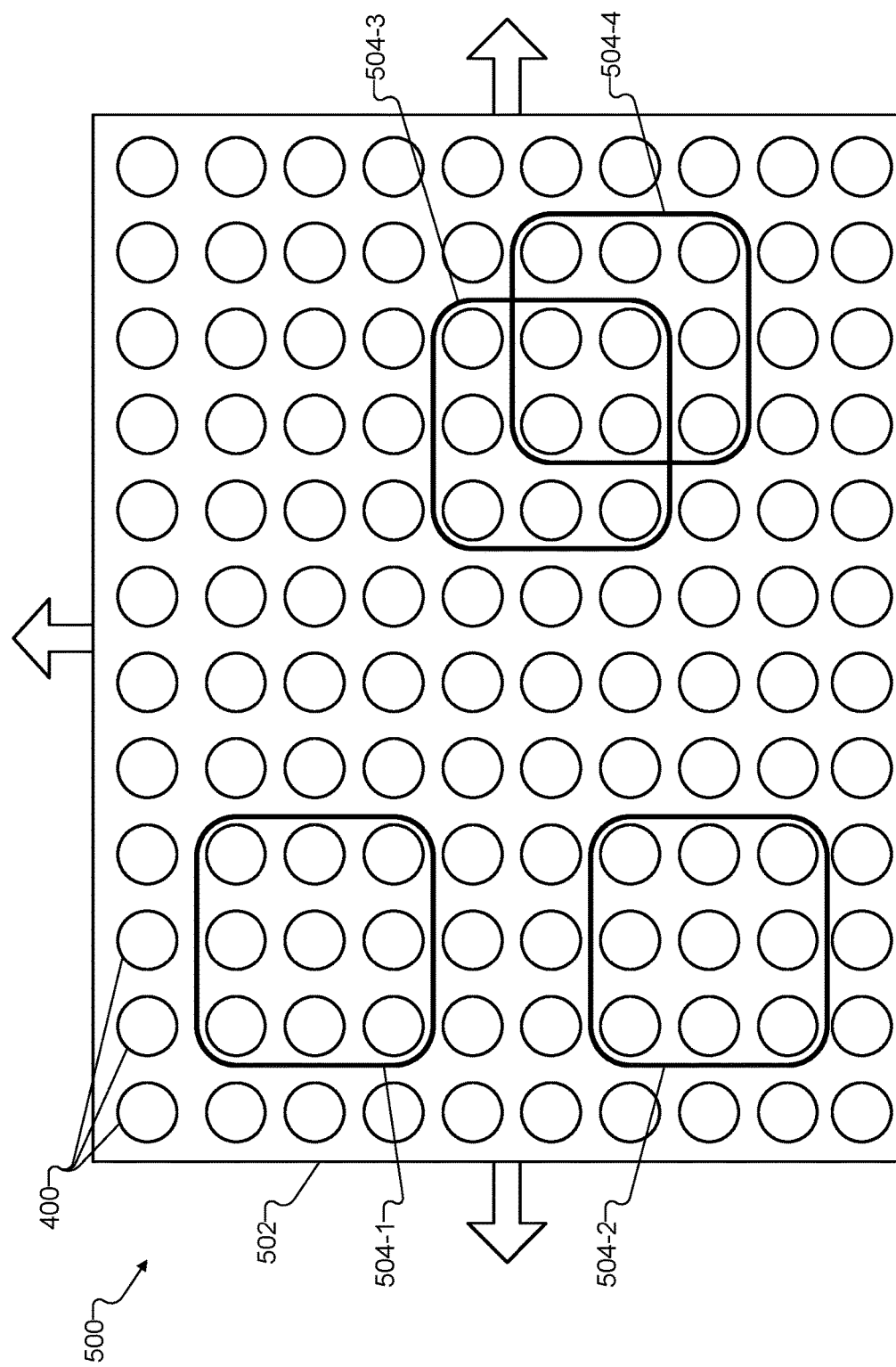
FIG. 5 illustrates exemplary field formation elements formed from field formation components such as the field formation component of FIG. 4 arranged in a two-dimensional grid according to principles described herein.

FIG. 5 illustrates exemplary field formation elements formed from a plurality of field formation components 500 that are each an implementation of field formation component 400 and are arranged in a 2D grid 502. As shown, subsets of field formation components 400 (e.g., 3×3 groupings of nine field formation components 400 in this example) within 2D grid 502 may make up a plurality of different field formation elements 504 (e.g., field formation elements 504-1 through 504-4). For example, a 3×3 subset of field formation components 400 in the top-left area of the portion of 2D grid 502 illustrated in FIG. 5 is included in a field formation element 504-1, while another 3×3 subset of field formation components 400 in the bottom-left area of the illustrated portion of 2D grid 502 make up a field formation element 504-2.

As illustrated above in relation to FIG. 4, each field formation component 400 in the plurality of field formation components 500 is individually controllable so as to produce a field component (i.e., an individual field) that is normally oriented to 2D grid 502 and that has an individually adjustable field strength. In other words, each of field formation components 400 may be oriented such that respective field components (e.g., fields 406) come out of the page with different field strengths (e.g., field strengths 408) so as to collectively form one or more apex points (e.g., apex points 302) of a haptically perceptible field above 2D grid 502.

Because each field formation component 400 may be individually controllable (e.g., by an independent power supply such as power supply 404), each field formation component 400 in the plurality of field formation components 500 may be independently powered on or off and/or may be dynamically powered with an independent amplitude of voltage and current so as to have an individually adjustable field strength. Accordingly, element configuration operations that system 100 may direct field formation components 400 to perform may include powering up (i.e., turning on), powering down (i.e., turning off), altering the field strength (e.g., by altering an amount of voltage and current applied to a particular field formation component 400), and so forth. In this way, each field formation element 504 (i.e., each subset group of field formation components 400) may collectively form an apex point of a haptically perceptible field that may be perceived by a user using a field perception apparatus.

For example, if a center field formation component 400 in a particular field formation element 504 has one particular field strength while each of the surrounding eight field formation components 400 in the field formation element 504 has a different field strength that is lower than the center field strength (e.g., but the same as one another), an apex point directly above the center field formation component in the field formation element 504 may be formed. If relatively strong field strengths (e.g., generated by relatively high voltages and currents) are used, this apex point may be relatively strong, impermeable, and/or far from the surface of 2D grid 502 to give the impression of a hard, solid object when the user perceives the apex point. Conversely, if relatively weak field strengths (e.g., generated by relatively low voltages and currents) are used, this apex point may be softer and more permeable, and/or may be closer to the surface of 2D grid 502 to give the impression of a softer object when the user perceives the apex point. Apex points 302 in FIG. 3 are each depicted to be different heights and widths to illustrate this potential diversity of apex point hardness, height, permeability, and/or other characteristics.

By directing field formation components 400 to power up appropriately and directing appropriate amounts of current and voltage to be applied to each one, system 100 may cause a variety of apex points to be formed so as to generate a dynamic, haptically perceptible virtual object as described above. While each field formation element 504 in FIG. 5 is illustrated as a 3×3 subset of field formation components 400, it will be understood that other groupings (e.g., 2×2 groupings, 4×4 groupings, 5×5 groupings, non-square groupings such as a 3×5 grouping, etc.) may also be employed in certain field formation element implementations. For example, different sizes and shapes of groupings may cause apex points to be in different locations in space (e.g., lower or higher off 2D grid 502), to have different levels of permeability (e.g., hardness or softness), to be more or less pointed, and the like. Additionally, 2D grid 502 may be implemented in different ways than illustrated in FIG. 5, such as by having offset rows of field formation components 400 so that each field formation element may include a center field formation component with four or six field formation components surrounding the center field formation component as may serve a particular implementation.

As illustrated by field formation elements 504-3 and 504-4, in certain examples, two field formation elements may share one or more field formation components 400. Specifically, certain field formation components 400 included within the plurality of field formation components 500 may be included (e.g., at different points in time) in different subsets of individual field formation components of different field formation elements 504 (i.e., field formation elements 504-3 and 504-4). Indeed, while only a few exemplary field formation elements are specifically illustrated in FIG. 5, it will be understood that any non-edge field formation component 400 within 2D grid 502 may act as a center field formation component of a field formation element that also includes the adjacent field formation components 400 on each side of the center field formation component. However, because each field formation component 400 may only be able to form a field component with one particular field strength at a time, it may not be possible for field formation elements that are overlapping (e.g., such as field formation elements 504-3 and 504-4) to be used at the same time. Rather, each overlapping field formation element may be used at different times (e.g., consecutive times as a contact point is tracked to be moving across the field from one field formation element to the other). It will be understood that non-overlapping field formation elements (e.g., such as field formation element 504-3 and 504-1) may, however, be used simultaneously to form two different apex points in the haptically perceptible field.

Figure 6:
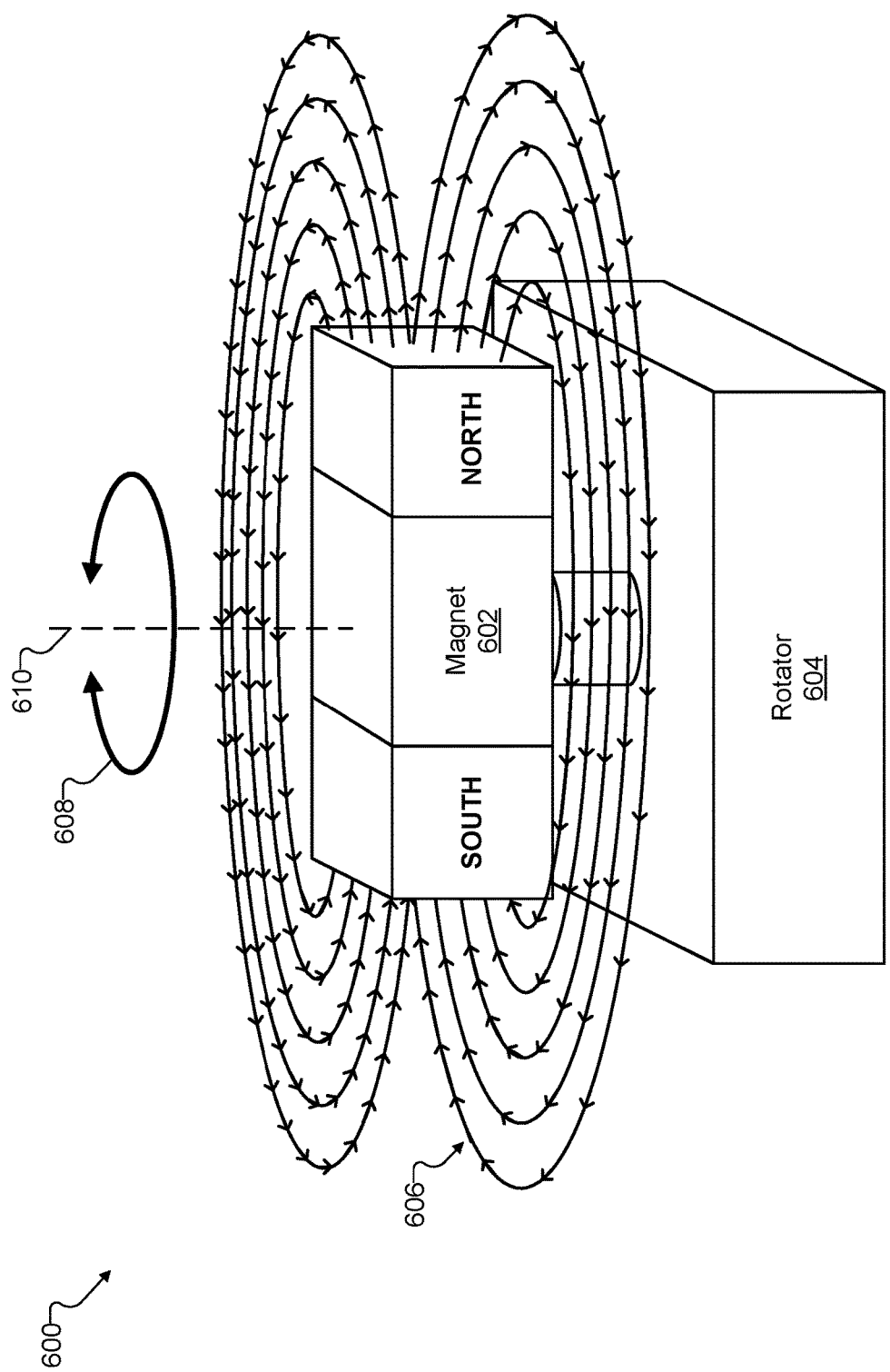
FIG. 6 illustrates another exemplary field formation component that may be included within a field formation element in the array of reconfigurable field formation elements of FIG. 2 according to principles described herein.

FIG. 6 illustrates another exemplary field formation component 600 that may be included within one or more field formation elements in an array of reconfigurable field formation elements (e.g., such as one or more of field formation elements 204 in field formation element array 202). Field formation component 600 includes a magnet 602 (e.g., a permanent magnet, an individually controlled coil magnet such as coil magnet 402, a non-individually controlled coil magnet, etc.) mounted on a rotating arm of a rotator 604 implemented by a motor (e.g., a servo motor) or other suitable rotating mechanism. As shown, magnet 602 may be a dipole magnet having north and south polarities and generating an individual field 606 (also referred to as a field component). If magnet 602 is a permanent magnet, a field strength of field 606 may be constant. However, it will be understood that, in examples where magnet 602 is a coil magnet, a variable field strength similar to field strength 408 may characterize field 606.

As shown, rotator 604 may be configured to cause magnet 602 to perform a rotation 608 about an axis 610. Accordingly, as mentioned above, magnet 602 may be an individually rotatable magnet that rotates about an axis to face in an individually adjustable direction.

Field 606 may be combined in space with other fields to form a haptically perceptible field in any suitable manner. For example, as described above, a field formation element included within an array of reconfigurable field formation elements may include a subset of individual field formation components included within a plurality of field formation components. In certain implementations, each field formation component may be implemented to be like field formation component 600 and the plurality of field formation components may be arranged in a 2D grid such as illustrated in FIG. 7A, or in another manner such as illustrated in FIG. 8A.

Figures 7A, 7B:
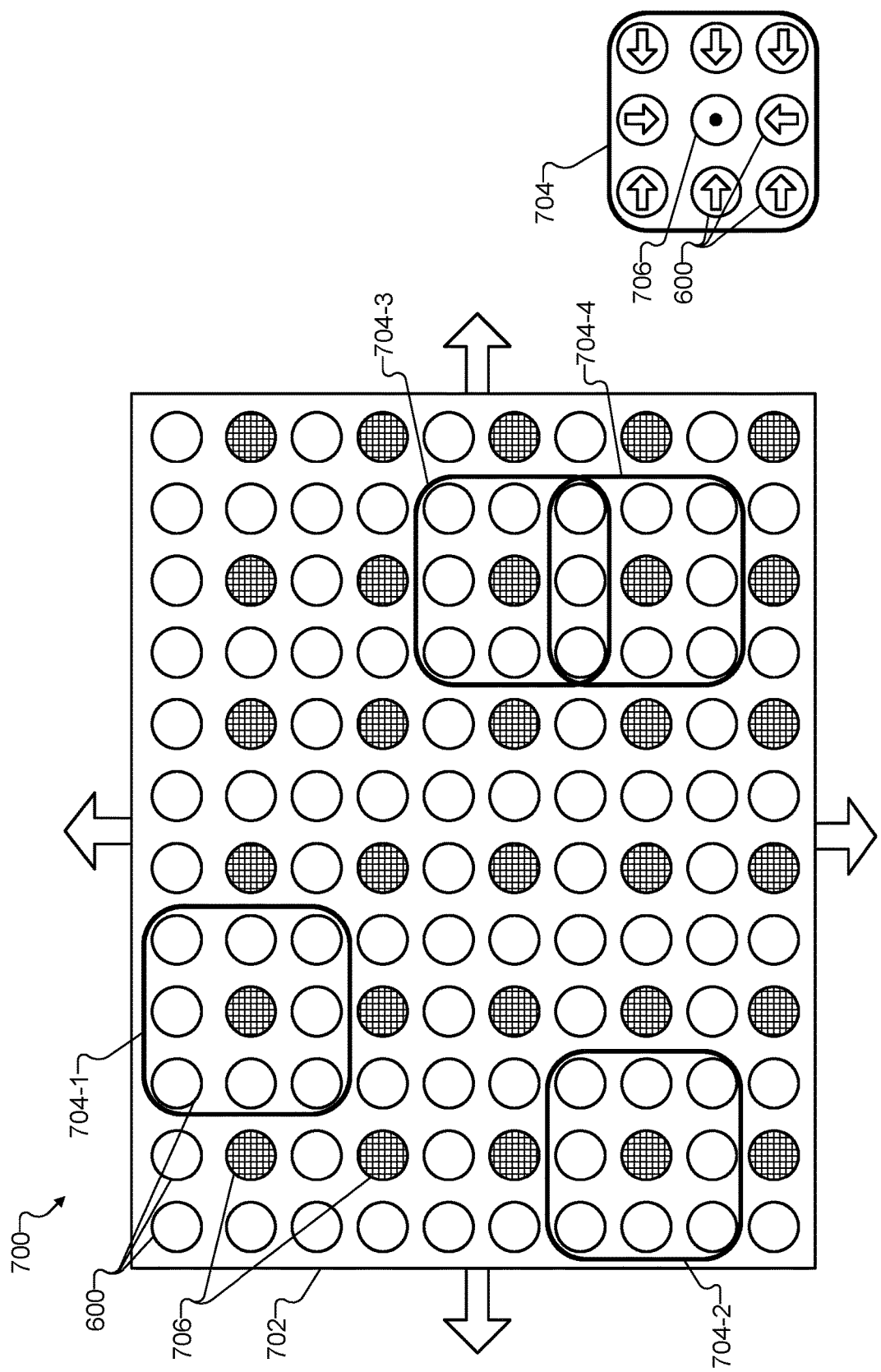
FIG. 7A illustrates exemplary field formation elements formed from field formation components such as the field formation component of FIG. 6 arranged in a two-dimensional grid according to principles described herein.
FIG. 7B illustrates an exemplary configuration for the field formation components forming a particular field formation element of FIG. 7A according to principles described herein.

FIG. 7A illustrates exemplary field formation elements each made up of field formation components arranged in a 2D grid 702. Specifically, as shown, a plurality of field formation elements 704 (e.g., field formation elements 704-1 through 704-4) each include a normally-oriented field formation component 706 (e.g., represented by a shaded circle) configured to produce a field component that is normally oriented to 2D grid 702 (i.e., coming out of and going into the page), and a plurality of tangentially-oriented field formation components 600 (e.g., represented by non-shaded circles) each individually rotatable about a respective axis normal to 2D grid 702 so as to produce a respective field component that is tangentially oriented to 2D grid 702 in an individually adjustable direction. For example, a subset of eight tangentially-oriented field formation components 600 that are each individually rotatable (e.g., as illustrated in FIG. 6) surrounds a normally-oriented field formation component 706 in field formation element 704-1, as well as in each of the other field formation elements 704 illustrated in FIG. 7A.

As described above (see FIG. 6), each field formation component 600 is individually rotatable so as to produce a field component (i.e., an individual field) that is tangentially oriented to 2D grid 702 in an individually adjustable direction. As such, each of field formation components 600 may be rotated such that respective field components (e.g., fields 606) may be combined with a field component formed by a normally-oriented field formation component 706 (e.g., which may not be rotatable but, rather may be implemented by a permanent magnet or by a normally-oriented field formation component such as field formation component 400). In this way, the subset of field formation components 600 and the field formation component 706 may collectively form an apex point (e.g., an apex point 302) of a haptically perceptible field above 2D grid 702.

Because each field formation component 600 may be individually rotatable by an independent rotator such as rotator 604, each tangentially-oriented field formation component 600 may be independently rotated to become oriented in an individually adjustable direction. Accordingly, element configuration operations that system 100 may direct field formation components 600 to perform may include rotation operations to orient the magnets at a certain angle, as well as other element configuration operations described herein such as powering up, powering down, altering the field strength, and so forth, in certain examples. In this way, each field formation element 704 may collectively form an apex point of a haptically perceptible field that may be perceived by a user using a field perception apparatus.

For example, FIG. 7B illustrates an exemplary configuration for the field formation components 600 and 706 forming a particular field formation element 704. If a field formation component 706 in this particular field formation element 704 is oriented normally to 2D grid 702 (e.g., such that a north polarity of a field component formed by the field formation component 706 comes out of the page) while each of the surrounding eight field formation components 600 in the field formation element 704 is tangentially oriented to point inward (e.g., such that respective north polarities of each field component formed by the field formation components 600 is facing in the direction of the arrows shown in FIG. 7B), an apex point directly above the normally-oriented field formation component 706 in the field formation element 704 may be formed. This apex point may be configured to be strong or weak, broad or pointed, and/or to have other characteristics in similar ways as described herein.

As similarly described above in relation to field formation elements 504-3 and 504-4 in FIG. 5, FIG. 7A shows that, in certain examples such as with field formation elements 704-3 and 704-4, two field formation elements may share one or more field formation components 600. Specifically, as shown in FIG. 7, certain tangentially-oriented field formation components 600 may be included (e.g., at different points in time) in different subsets of individual field formation components of different field formation elements 704 (i.e., field formation elements 704-3 and 704-4). While only a few exemplary field formation elements 704 are specifically illustrated in FIG. 7, it will be understood that any normally-oriented field formation component 706 within 2D grid 702 may act as a center of a field formation element that also includes one or more of the adjacent tangentially-oriented field formation components 600 surrounding it. However, because each tangentially-oriented field formation component may be rotated in only one direction at a time, it may not be possible for field formation elements that are overlapping (e.g., such as field formation elements 704-3 and 704-4) to be used at the same time. Rather, each overlapping field formation element may be used at different times (e.g., consecutive times as a contact point is tracked to be moving across the field from one field formation element to the other). It will be understood that non-overlapping field formation elements (e.g., such as field formation element 704-3 and 704-1) may, however, be used simultaneously to form two different apex points in the haptically perceptible field.

FIG. 8A illustrates another exemplary type of field formation element made up of field formation components arranged on a 2D surface 802. Specifically, as shown, a plurality of field formation elements 804 (e.g., field formation elements 804-1 through 804-4) each include a plurality of tangentially-oriented field formation components 600 each individually rotatable about a respective axis normal to 2D surface 802 so as to produce a respective field component that is tangentially oriented to 2D surface 802 in an individually adjustable direction, as described above. For example, a discrete formation of eight tangentially-oriented field formation components 600 arranged in a circle (e.g., included in a circular casing or the like in certain implementations) may make up field formation element 804-1, as well as each of the other field formation elements 804 illustrated in FIG. 8A.

As described above (see FIG. 6), each field formation component 600 is individually rotatable so as to produce a field component (i.e., an individual field) that is tangentially oriented to 2D surface 802 in an individually adjustable direction. As such, each of field formation components 600 may be rotated such that respective field components (e.g., fields 606) combine to form a Halbach formation (e.g., a Halbach cylinder) that creates an apex point (e.g., such as one of apex points 302) of a haptically perceptible field above 2D surface 802.

FIG. 8B illustrates an exemplary configuration for the field formation components 600 forming a particular field formation element 804. If each of the eight field formation components 600 in the field formation element 804 is tangentially oriented to point inward (e.g., such that respective north polarities of each field component formed by the field formation components 600 is facing in the direction of the arrows shown in FIG. 8B), an apex point directly above the center of the field formation element 804 may be formed. This apex point may be configured to be strong or weak, broad or pointed, and/or to have other characteristics in similar ways as described herein.

In contrast to field formation elements 504 and 704 described above, field formation elements 804 may each be configured as discrete field formation elements that include an arrangement of individual field formation components 600 uniquely associated with the particular field formation element 804. In other words, unlike other field formation elements described above which may overlap and share certain field formation components, each field formation component 600 in FIG. 8A may be uniquely associated with only one particular field formation element 804 in certain examples such as the configuration shown. As such, in FIG. 8A each field formation element 804 (e.g., including field formation elements that are not explicitly labeled) may be used at the same time without regard to whether other field formation elements 804 are currently in use. In other configurations, certain field formation components 600 may be shared between field formation elements 804 such that field formation elements 804 may at least partially overlap and may not be used simultaneously.

Various examples have been provided above describing different types of field formation elements composed of different types of field formation components. Regardless of how field formation elements in a particular array of reconfigurable field formation elements operate or are made up, however, system 100 may direct the array of reconfigurable field formation elements to form a haptically perceptible field so as to generate a haptically perceptible virtual object representative of a 3D virtual object. For example, the 3D virtual object may be included within a virtual reality world being experienced by a user by way of a media player device, and the haptically perceptible virtual object may be generated so as to correspond to (e.g., be in alignment with) the 3D virtual object as perceived by the user as the user experiences the virtual reality world by way of the media player device.

Figure 9:
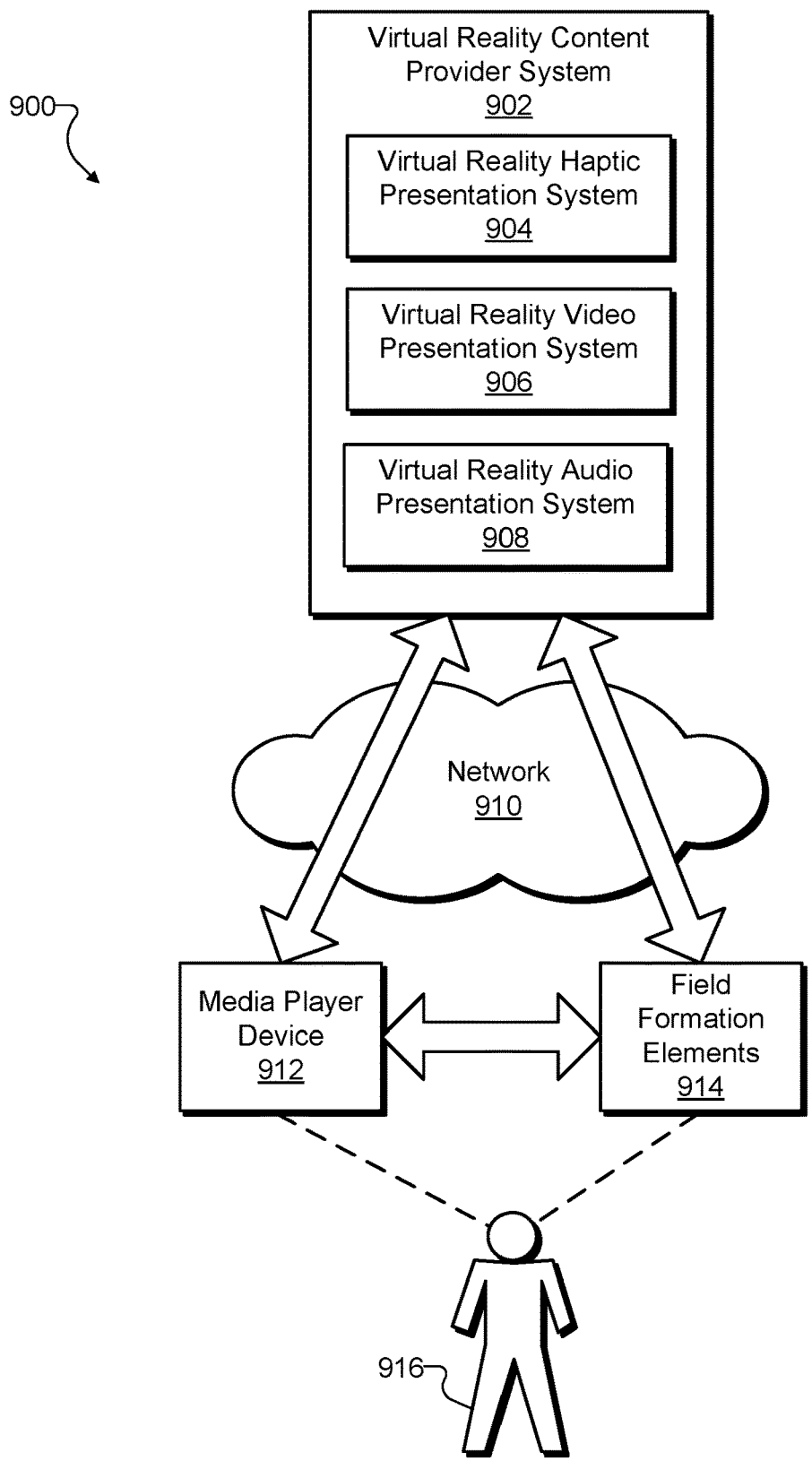
FIG. 9 illustrates an exemplary configuration in which an exemplary virtual reality content provider system generates and provides virtual reality data to an exemplary media player device and to an exemplary array of reconfigurable field formation elements by way of a network according to principles described herein.

FIG. 9 illustrates how visual, audio, and haptic stimulation may all be aligned and provided together in an immersive virtual reality experience where a user can not only see and hear 3D virtual objects in a virtual reality world, but also touch and, in certain implementations, manipulate them. More particularly, FIG. 9 depicts an exemplary configuration 900 in which an exemplary virtual reality content provider system 902 ("provider system 902") generates virtual reality data. For example, provider system 902 may include a virtual reality haptic presentation system 904, a virtual reality video presentation system 906, and a virtual reality audio presentation system 908. Provider system 902 may provide virtual reality data (e.g., virtual reality data related to visual, audible, and/or haptic stimulation) by way of a network 910 to an exemplary media player device 912 and an exemplary array of reconfigurable field formation elements 914 both used by a user 916 to experience a virtual reality world and haptically perceptible virtual reality objects included therein.

Presentation systems 904 through 908 within provider system 902 may each capture, receive, and process data representative of a virtual scene (e.g., which may be based on a real-world scene or a computer-generated scene) including one or more 3D virtual objects. Presentation systems 906 and 908 may focus on generating virtual reality data to present, respectively, visual and audible stimulation (e.g., video and sound elements) simulating the 3D virtual objects within the virtual scene. As such, virtual reality data generated by presentation systems 906 and 908 may be transmitted to media player device 912, which may include a display screen (e.g., a head-mounted display screen or the like in certain implementations) and audio output transceivers (e.g., associated with speakers, a headphone jack, etc.) to present audiovisual content to user 916.

In a similar way, presentation system 904 may focus on generating virtual reality data to present haptic stimulation simulating the 3D virtual objects within the virtual scene. For example, presentation system 904 may include or implement system 100, and the virtual reality data associated with presenting haptic stimulation may include instructions for directing field formation element array 914 (e.g., individually controllable power supplies within field formation element array 914, individually rotatable rotators within field formation element array 914, etc.) to perform different sets of element configuration operations to form haptically perceptible fields to be perceived by user 916. As such, virtual reality data generated by presentation system 904 may be transmitted to field formation element array 914 directly over network 910, or may be combined with virtual reality data transmitted over network 910 to media player device 912, which may then transmit the instructions representative of the sets of element configuration operations to field formation element array 914.

Network 910 may include a provider-specific wired or wireless network (e.g., a cable or satellite carrier network or a mobile telephone network), the Internet, a wide area network, a content delivery network, or any other suitable network. Data may flow between provider system 902 and various client-side devices such as a plurality of media player devices (e.g., including media player device 912) and field formation element arrays (e.g., including field formation element array 914) using any communication technologies, devices, media, and protocols as may serve a particular implementation.

As mentioned above, media player device 912 may include any suitable processing components, display screens, audio output, and so forth for presenting virtual reality media content to user 916. As such, media player device 912 may be implemented as a dedicated virtual reality device (e.g., a virtual reality gaming system including a head-mounted display screen and the like), a general mobile device (e.g., a smartphone, a tablet, etc.), a personal computer (e.g., a laptop, a desktop), a virtual reality television, or any other device as may serve a particular implementation. Field formation element array 914 may be implemented as any of the field formation element arrays described herein and, as such, may include any suitable type of field formation elements made up of any suitable type of field formation components as may serve a particular implementation.

While various exemplary methods and systems described herein, including the example of configuration 900, relate to providing virtual reality content for a user to experience, it will be understood that various applications other than virtual reality may also make use of implementations of methods and systems for presenting haptically perceptible virtual objects (e.g., based on depth data) as described herein. For example, along with virtual reality applications, other types of applications such as augmented reality applications, digital 3D modeling applications, entertainment applications, décor applications, and/or any other suitable types of applications may employ implementations of methods and/or systems described herein as may serve such applications.

Figure 10:
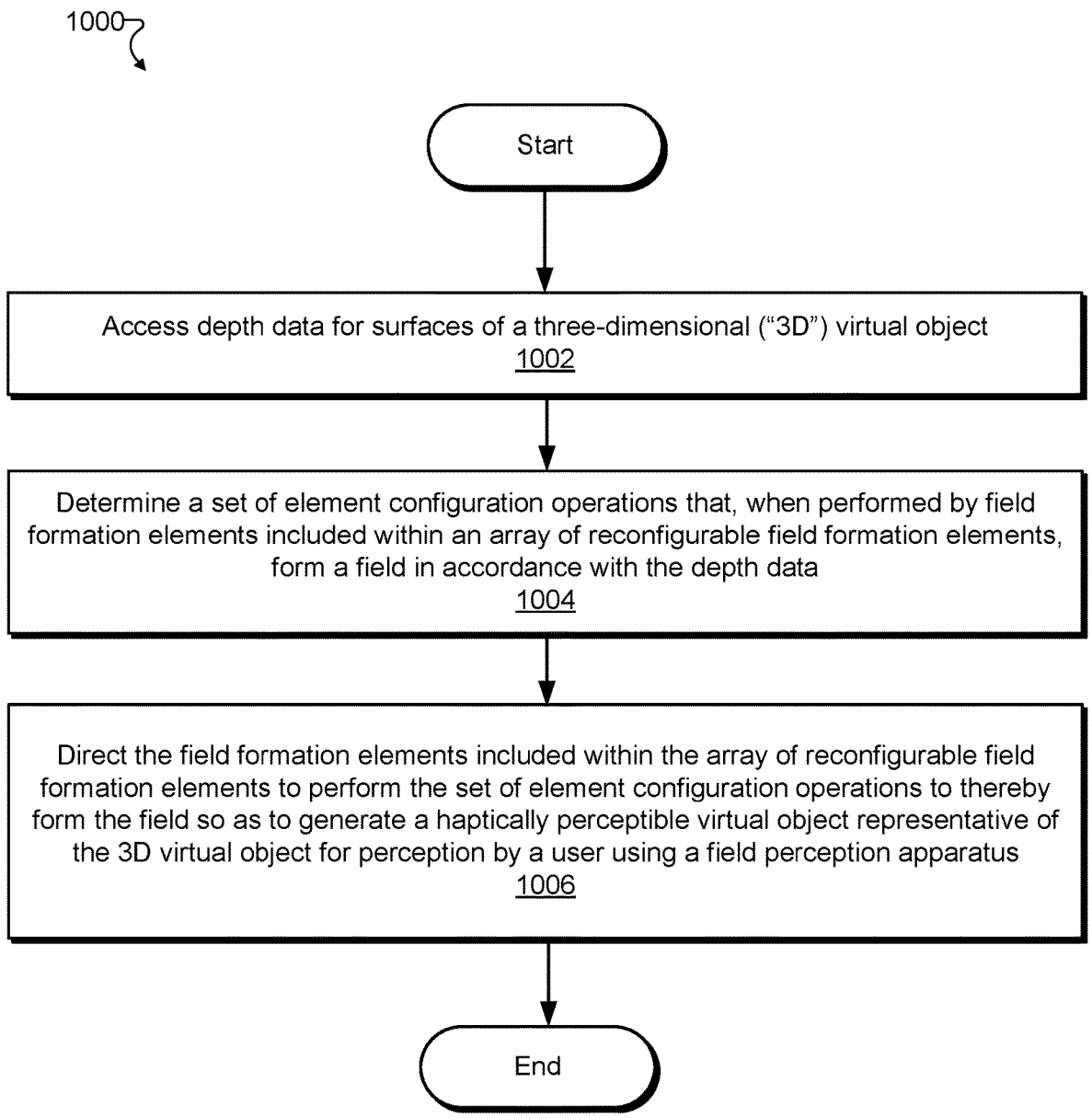
FIG. 10 illustrates an exemplary method for presenting haptically perceptible virtual objects according to principles described herein.

FIG. 10 illustrates an exemplary method for presenting haptically perceptible virtual objects. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or by any implementation thereof.

In operation 1002, a virtual object presentation system may access depth data for surfaces of a 3D virtual object. Operation 1002 may be performed in any of the ways described herein.

In operation 1004, the virtual object presentation system may determine a set of element configuration operations that, when performed by field formation elements included within an array of reconfigurable field formation elements, may form a field in accordance with the depth data accessed in operation 1002. For example, the virtual object presentation system may determine the set of element configuration operations based on the depth data for the surfaces of the 3D virtual object. The field formed by the array of reconfigurable field formation elements as a result of the performance of the set of element configuration operations determined in operation 1004 may be haptically perceptible to a user using a field perception apparatus. Operation 1004 may be performed in any of the ways described herein.

In operation 1006, the virtual object presentation system may direct the field formation elements included within the array of reconfigurable field formation elements to perform the set of element configuration operations to thereby form the haptically perceptible field. As such, the array of reconfigurable field formation elements may generate a haptically perceptible virtual object representative of the 3D virtual object. For example, the haptically perceptible virtual object may be perceptible by the user using the field perception apparatus. Operation 1006 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
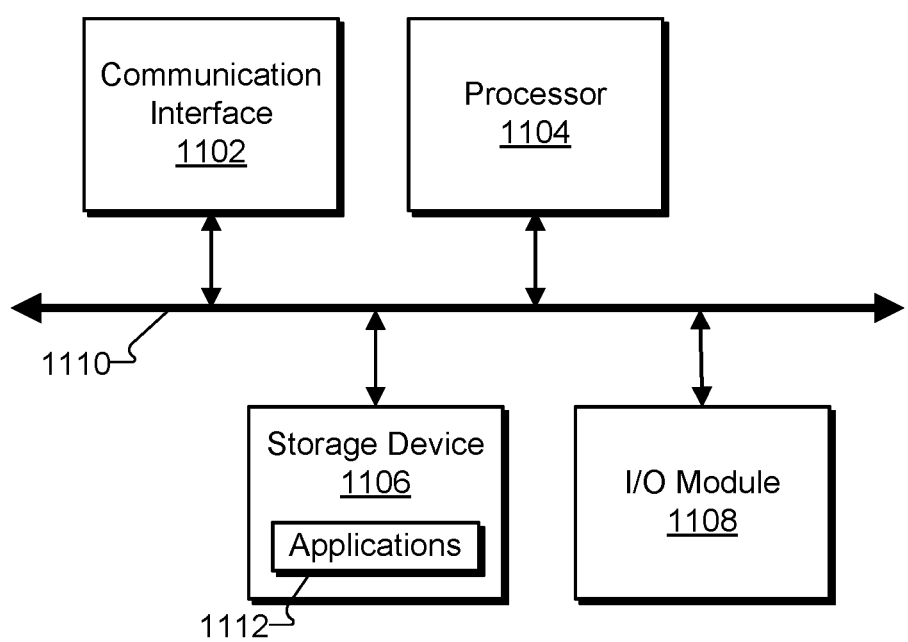
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit (e.g., a central processing unit and/or a graphics processing unit) capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein (e.g., operations of system 100) may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual reality experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more operations or functions associated with facilities 102 or 104 of system 100 (see FIG. 1). Likewise, storage facility 106 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a virtual object presentation system, depth data for surfaces of a three-dimensional ("3D") virtual object;
   determining, by the virtual object presentation system based on the depth data for the surfaces of the 3D virtual object, a set of element configuration operations that, when performed by field formation elements included within an array of field formation elements, form a field in accordance with the depth data, wherein the field is a reconfigurable magnetic field that is formed by the array of field formation elements and that is haptically perceptible to a user when the user interacts with the reconfigurable magnetic field using a field perception apparatus; and
   directing, by the virtual object presentation system, the field formation elements included within the array of field formation elements to perform the set of element configuration operations to thereby form the reconfigurable magnetic field so as to generate, for perception by the user when the user interacts with the reconfigurable magnetic field using the field perception apparatus, a haptically perceptible virtual object representative of the 3D virtual object.

2. The method of claim 1, wherein:
   the 3D virtual object is included within a virtual reality world being experienced by the user by way of a media player device; and
   the haptically perceptible virtual object is generated so as to correspond to the 3D virtual object as perceived by the user as the user experiences the virtual reality world by way of the media player device.

3. The method of claim 1, further comprising tracking, by the virtual object presentation system as the user perceives the haptically perceptible virtual object by interacting with the reconfigurable magnetic field using the field perception apparatus, a dynamic location of a contact point of the field perception apparatus with respect to the array of field formation elements; and
   wherein the determining of the set of element configuration operations takes into account the tracking of the contact point such that the reconfigurable magnetic field is formed by the array of field formation elements to include an apex point corresponding to the tracked dynamic location of the contact point.

4. The method of claim 1, wherein:
   each field formation element included within the array of field formation elements includes a subset of individual field formation components included within a plurality of field formation components arranged in a two-dimensional ("2D") grid;

each field formation component in the plurality of field formation components is individually controllable so as to produce a field component that is normally oriented to the 2D grid and that has an individually adjustable field strength; and a particular field formation component included within the plurality of field formation components is included, at different points in time, in different subsets of individual field formation components of different field formation elements within the array of field formation elements.

5. The method of claim 1, wherein:

each field formation element included within the array of field formation elements includes a subset of individual field formation components included within a plurality of field formation components arranged in a two-dimensional ("2D") grid;

each subset of individual field formation components includes
  a normally-oriented field formation component configured to produce a field component that is normally oriented to the 2D grid, and
  a plurality of tangentially-oriented field formation components each individually rotatable about a respective axis normal to the 2D grid so as to produce a respective field component that is tangentially oriented to the 2D grid in an individually adjustable direction; and a particular tangentially-oriented field formation component is included, at different points in time, in different subsets of individual field formation components of different field formation elements within the array of field formation elements.

6. The method of claim 1, wherein:

each field formation element included within the array of field formation elements includes an arrangement of individual field formation components disposed on a two-dimensional ("2D") surface;

the field formation components included within each arrangement of individual field formation components are each individually rotatable about a respective axis normal to the 2D surface so as to produce a respective field component that is tangentially oriented to the 2D surface in an individually adjustable direction; and the field formation components included within a particular arrangement of individual field formation components are uniquely associated with a particular field formation element within the array of field formation elements.

7. The method of claim 1, wherein the field perception apparatus allows the user to interact with the reconfigurable magnetic field by at least one of:

including material that forms an opposing magnetic field configured to repel the reconfigurable magnetic field;

including material that is treated with a diamagnetic substance configured to repel the reconfigurable magnetic field; and including material that is heated past a Curie point so as to be in a paramagnetic state.

8. The method of claim 1, wherein each field formation element included within the array of field formation elements includes a plurality of field formation components each implemented as an individually controllable coil magnet having an individually adjustable field strength.

9. The method of claim 1, wherein each field formation element included within the array of field formation elements includes a plurality of field formation components each implemented as an individually rotatable permanent magnet that rotates about an axis to face in an individually adjustable direction.

10. The method of claim 1, embodied as computer-executable instructions on at least one non-transitory computer-readable medium.

11. A system comprising:

at least one physical computing device that
  accesses depth data for surfaces of a three-dimensional ("3D") virtual object;
  determines, based on the depth data for the surfaces of the 3D virtual object, a set of element configuration operations that, when performed by field formation elements included within an array of field formation elements, form a field in accordance with the depth data, wherein the field is a reconfigurable magnetic field that is formed by the array of field formation elements and that is haptically perceptible to a user when the user interacts with the reconfigurable magnetic field using a field perception apparatus; and
  directs the field formation elements included within the array of field formation elements to perform the set of element configuration operations to thereby form the reconfigurable magnetic field so as to generate, for perception by the user when the user interacts with the reconfigurable magnetic field using the field perception apparatus, a haptically perceptible virtual object representative of the 3D virtual object.

12. The system of claim 11, wherein:

the 3D virtual object is included within a virtual reality world being experienced by the user by way of a media player device; and the haptically perceptible virtual object is generated so as to correspond to the 3D virtual object as perceived by the user as the user experiences the virtual reality world by way of the media player device.

13. The system of claim 11, wherein:

the at least one physical computing device further tracks, as the user perceives the haptically perceptible virtual object by interacting with the reconfigurable magnetic field using the field perception apparatus, a dynamic location of a contact point of the field perception apparatus with respect to the array of field formation elements; and the determination of the set of element configuration operations takes into account the tracking of the contact point such that the reconfigurable magnetic field is formed by the array of field formation elements to include an apex point corresponding to the tracked dynamic location of the contact point.

14. The system of claim 11, wherein:

each field formation element included within the array of field formation elements includes a subset of individual field formation components included within a plurality of field formation components arranged in a two-dimensional ("2D") grid;

each field formation component in the plurality of field formation components is individually controllable so as to produce a field component that is normally oriented to the 2D grid and that has an individually adjustable field strength; and a particular field formation component included within the plurality of field formation components is included, at different points in time, in different subsets of individual field formation components of different field formation elements within the array of field formation elements.

15. The system of claim 11, wherein:
each field formation element included within the array of field formation elements includes a subset of individual field formation components included within a plurality of field formation components arranged in a two-dimensional ("2D") grid;
each subset of individual field formation components includes
a normally-oriented field formation component configured to produce a field component that is normally oriented to the 2D grid, and
a plurality of tangentially-oriented field formation components each individually rotatable about a respective axis normal to the 2D grid so as to produce a respective field component that is tangentially oriented to the 2D grid in an individually adjustable direction; and
a particular tangentially-oriented field formation component is included, at different points in time, in different subsets of individual field formation components of different field formation elements within the array of field formation elements.

16. The system of claim 11, wherein:
each field formation element included within the array of field formation elements includes an arrangement of individual field formation components disposed on a two-dimensional ("2D") surface;
the field formation components included within each arrangement of individual field formation components are each individually rotatable about a respective axis normal to the 2D surface so as to produce a respective field component that is tangentially oriented to the 2D surface in an individually adjustable direction; and
the field formation components included within a particular arrangement of individual field formation components are uniquely associated with a particular field formation element within the array of field formation elements.

17. The system of claim 11, wherein the field perception apparatus allows the user to interact with the reconfigurable magnetic field by at least one of:
including material that forms an opposing magnetic field configured to repel the reconfigurable magnetic field;
including material that is treated with a diamagnetic substance configured to repel the reconfigurable magnetic field; and
including material that is heated past a Curie point so as to be in a paramagnetic state.

18. The system of claim 11, wherein each field formation element included within the array of field formation elements includes a plurality of field formation components each implemented as an individually controllable coil magnet having an individually adjustable field strength.

19. The system of claim 11, wherein each field formation element included within the array of field formation elements includes a plurality of field formation components each implemented as an individually rotatable permanent magnet that rotates about an axis to face in an individually adjustable direction.

20. A system comprising:
an array of field formation elements that
perform a set of element configuration operations received from a virtual object presentation system that accesses depth data for surfaces of a three-dimensional ("3D") virtual object and determines the set of element configuration operations based on the depth data for the surfaces of the 3D virtual object; and
form, as a result of the performance of the set of element configuration operations, a reconfigurable magnetic field that is haptically perceptible to a user when the user interacts with the reconfigurable magnetic field using a field perception apparatus, the reconfigurable magnetic field formed so as to generate, for perception by the user when the user interacts with the reconfigurable magnetic field using the field perception apparatus, a haptically perceptible virtual object representative of the 3D virtual object.

* * * * *